United States Patent
Ahn

(10) Patent No.: US 8,234,017 B2
(45) Date of Patent: Jul. 31, 2012

(54) ELECTRONIC SMART METER ENABLING DEMAND RESPONSE AND METHOD FOR DEMAND RESPONSE

(75) Inventor: Sang-Ho Ahn, Chungcheongbuk-do (KR)

(73) Assignee: LS Industrial Systems Co., Ltd., Anyang-Si, Gyeonggi-Do (KR)

( * ) Notice: Subject to any disclaimer, the term of this patent is extended or adjusted under 35 U.S.C. 154(b) by 691 days.

(21) Appl. No.: 12/365,326

(22) Filed: Feb. 4, 2009

(65) Prior Publication Data

US 2009/0198384 A1  Aug. 6, 2009

(30) Foreign Application Priority Data

Feb. 5, 2008  (KR) ................ 10-2008-0011850

(51) Int. Cl.
*G01R 21/06* (2006.01)
*G05B 15/02* (2006.01)
*G06F 19/00* (2011.01)

(52) U.S. Cl. .............. 700/295; 700/20; 700/62; 700/83; 340/870.02

(58) Field of Classification Search .............. 700/17, 700/19–20, 65, 83, 295; 340/870.02, 870.19; 709/201–203, 217–219, 224, 249–250
See application file for complete search history.

(56) References Cited

U.S. PATENT DOCUMENTS

| 6,124,806 | A  | * | 9/2000 | Cunningham et al. ... 340/870.02 |
| 6,772,052 | B1 | * | 8/2004 | Amundsen et al. ........... 700/291 |
| 7,529,594 | B2 | * | 5/2009 | Walters et al. .................. 700/17 |
| 7,539,581 | B2 | * | 5/2009 | Swarztrauber et al. ......... 702/61 |
| 7,546,167 | B2 | * | 6/2009 | Walters et al. .................. 700/17 |
| 7,650,425 | B2 | * | 1/2010 | Davis et al. .................. 709/238 |

FOREIGN PATENT DOCUMENTS

| KR | 1020050066392 | 6/2005 |
| KR | 1020050081976 | 8/2005 |

* cited by examiner

*Primary Examiner* — John R. Cottingham
*Assistant Examiner* — Douglas Lee
(74) *Attorney, Agent, or Firm* — Lee, Hong, Degerman, Kang & Waimey

(57) ABSTRACT

The electric smart meter enabling demand response and method for the demand response are disclosed capable of acquiring an option and response information from a subscriber for enabling an active demand control, and to this end, the electric smart meter is embedded therewithin at least one or more integrated monitoring modules and includes microprocessors for transmitting a power control command to a relevant integrated monitoring module in response to a power control program based on the rate system, and controllably transmitting the measured and monitored data stored in the memory to the master server side via the communication module as well.

12 Claims, 4 Drawing Sheets

ELECTRONIC SMART METER ENABLING DEMAND RESPONSE AND METHOD FOR DEMAND RESPONSE

CROSS-REFERENCE TO RELATED APPLICATION

The present application is based on, and claims priority from, Korean Application Numbers 10-2008-011850, filed Feb. 5, 2008, the disclosure of which is incorporated by reference herein in its entirety.

BACKGROUND

The present disclosure relates to an electric smart meter, and more particularly to an electric smart meter enabling a demand response mounted inherently or outside thereof with various lower-level components and capable of performing remote metering services and interactive communications and controls among the various lower-level components.

Although structural changes of power and energy industries for building cost-effective power and energy industry systems through build-up of competitive market systems have domestically settled down, market inherent efficiency has hardly sunk in due to supplier-oriented transaction policy and passive demand control under the hitherto top-to-bottom monopolistic energy supply system.

In one way of effective technical approach to the aforementioned shortcoming, an improvement to the current demand control system may be considered as being plausible, and a measure of utilizing subscribers who are concurrently energy consumers as resources may obtain persuasive power. In order to implement a change of view point from a subscribe load as a consumptive fixed sunk cost to an opportunity cost as active operation resources, a positive subscriber response should be induced, and it is imperative that the positive response reflected on the market should be conveyed to realize an appropriate supply/demand of energy reactive to costs, thereby leading to an effective energy control.

To this end, response information resultant from rightful selection of subscribers as resources should be transmitted to energy producers, and infrastructure build-up capable of reflecting the response information to the market should be a precedent condition, through which effective and competitive market systems can be constructed, nation-wide energy supply/demand problems can be solved and realistic demand control can be made possible.

FIG. 1 is a schematic view illustrating various remote metering and controlling systems according to the related art, where the systems include a low-level component 10, a gateway 30 and a high-level component 50.

The low-level component 10 may include, for example but not limited thereto, an automatic meter reader (AMR) 11, a power meter 12, a power quality (PQ) system 13, a demand controller 14, a heat contact alarm 15, an arc leakage monitor 16, an over power source monitor 17, a facilities controller 18 and a home automation system 19.

The gateway 30 is a wired/wireless network for enabling the low-level component 10 to communicate with the high-level component 50, where the high-level component 50 is an operation system for controlling and monitoring information collected from relevant low-level component 10.

Now, functionality of various systems in the low-level component 10 will be described.

First, the AMR 11 may obtain various energy consumption data (i.e., gas, city water, hot water, heat and electricity) and provide the remotely obtained information to a relevant high-level server 51 via the gateway 30. In other words, the AMR 11 may provide various functions, such as necessary data for real time monitoring, analysis of metered data, monthly reports, daily reports, transitional reports or functions of internet metering, metered information for each household or time and pay referrals.

The power meter 12 may obtain metered data relative to power consumption and provide the data to a relevant high-level server 52 via the gateway 30.

The PQ system 13 may obtain various pieces of power quality information and provide the information to a relevant high-level server 53 via the gateway 30, whereby the high-level server 53 can monitor various power quality, e.g., voltages, phases, active power, reactive power, apparent power, frequencies, power factors, distortion factors, demand, maximum values and the like.

The demand controller 14 may provide a load control function for reducing a peak load in response to control of relevant server 54, so that the controller 14 may possess such functions as control function in response to load characteristics and output methods (e.g., circulation control, priority control, complex control, direct control and remote load control), control function for each season and business, pay system adjustment for each season and business, alarm function, power consumption estimation function, demanded power report function, power consumption patter and peak power transitional analysis.

The heat contact alarm 15 may measure contact temperatures and serve to provide an alarm and a notification to a high-level server 55 via the gateway 30.

The arc leakage monitor 16 may monitor an arc, a spark and electric power leakage and serve to provide an alarm and a notification to a relevant high-level server 55 via the gateway 30.

The over-power source monitor 17 may serve to provide an alarm or a notification to a high-level server 57 via the gateway 30 over-current and over-voltage occurrences on circuits of circuit breakers, switches, bus bars, switchgears and incoming panels, to name a few.

The facilities controller 18 may possess functions of monitoring major facilities in a building or a structure and transmitting the monitored information to a high-level server 58 via the gateway 30. For example, facilities monitoring may include major power facilities monitoring (e.g., a water level monitoring, a water tank level monitoring, an inundation monitoring, an elevator monitoring, a hydrant monitoring and a fire prevention switch monitoring), a profile monitoring during control operation and a trend analysis using database storage.

The home automation system 19 may be composed of a network system for providing conveniences within living quarters and various operation systems, and serve to provide the life convenience, theft prevention services and remote medical treatment services. For example, the home automation system 19 may include a human-machine interface (HMI), a home appliance control, a remote metering, a portable terminal control, a video conference, a parking management, a locker system, a theft prevention system, a door lock, a health care and a janitor room connection.

That is, the conventional demand control or management has been limited to a manager-oriented function in performing remote monitoring relative to power consumption, acquisition of relevant power information according to individual purpose of a product, control in response to a set-up value, an arc monitoring service and a temperature monitoring service, such that there have been difficulties in performing an active demand control due to absence of necessary functions for effective energy management and coping with mercurial market environments resultant from structural changes of electric power industries.

Basic functions to be complemented for the existing technologies and products alike may include from multi-angled views demand response-related functions, functions for providing incentive purposes and functions for combined provision of factors for overcoming various market environments.

Now, shortcomings related to the existing technologies and products will be explained in more detail. That is, it is difficult to reflect a response relative to subscriber selection, to apply various pay systems for incentives to subscribers, and to provide a necessary combined function for obtaining stable receipt of electricity. In addition, there have been no functions in the existing power meters on facilities status monitoring, electric power quality monitoring or demand control management and maximum power control monitoring.

Furthermore, although the demand controller 14 has been incepted distributed for subscribers and load management providers for the purpose of improving load efficiency as a way of demand controls, the demand controller 14 has not attracted a large amount of interests from consumers so far due to limit that it is a supplier-oriented, lopsided public demand control method.

In consideration of large benefits to be awarded for the effective demand control, enhanced positive efforts are required from the government and related providers, and on top of that, a more advanced demand control is required that is capable of eliciting an active participation from consumers, not like the one that is unilateral demand control.

An electronic statement presentment (ESP) system (which replaces the preparation and mailing of paper statements and invoices from a biller with electronic delivery) and electric power sales business project ambitiously promoted by the government based on revitalization of new regeneration and power distribution system are expected to be revitalized, whereby various services and development of systems toward the demand response are expected to increase, and therefore an active preparation thereto is sincerely required in earnest.

There have been marketed products capable of detecting and notifying occurrences of arcs and leakages as electric safety monitoring gadgets, but the products are large-sized and very expensive in consideration of functions to result in difficulty in securing a space for accommodation of the gadget. There is another disadvantage in that no interruption command is given to thereby provide a restricted usage in performing a subsequent action resultant from detection of a danger.

Furthermore, the products need additional purchases for lack of essential functions for monitoring over-voltage, over-current and temperature detection in preparation for fire prevention and electric safety, which makes the products inconvenient in actual application in terms of accommodation space and cost.

There are facilities control systems and building control systems on the market in relation to functionality of facilities management. The facilities control system has a shortcoming in that it is large-sized, very expensive and has a difficulty in interchangeability. The building control systems such as an indoor base station (IBS) and a building and energy management system (BEMS) are installed for the purpose of monitoring an electric system and facilities, a lighting control and a building administration in a building, but the systems are also expensive and require high maintenance expenses, such that a real adoptability of the systems are found to be very low.

Of all things, it is absolutely imperative to obtain lump information through an integrated reliable device under a complex energy operation environment calling for a right opportune judgment by acquiring various pieces of necessary information in a lump. To this end, if the low-level components illustrated in FIG. 1 are to be purchased and installed according to the existing method, a large amount of expenses would have to be footed to purchase products corresponding to the low-level components only, and a large space would be needed for accommodation of the products. Worse yet, there is no way to escape an absurd reality of individual installation of each operational program for individual product operation and lump management, and design and management of additional integrated operational program.

SUMMARY

It is an object of the present disclosure to provide an electric smart meter enabling demand response and a method for the demand response, capable of acquiring selection and response information from a subscriber for enabling an active demand control, whereby an objective demand estimate is made possible.

It is another object of the present disclosure to provide an electric smart meter enabling demand response and a method for the demand response, embedded with various integrated monitoring modules within an electric smart meter thereby enabling a two-way communication between a remote master server and various integrated monitoring modules, whereby a remote metering, a remote control and a demand response of various integrated monitoring modules are made possible.

It is still another object of the present disclosure to provide an electric smart meter enabling demand response and a method for the demand response, embedded with an interface within an electric smart meter capable of connecting and communicating with various integrated monitoring modules, thereby enabling a two-way communication between a remote meter server and various integrated monitoring modules, whereby a remote metering, a remote control and a demand response of various integrated monitoring modules are made possible.

In one general aspect of the present disclosure, an electric smart meter enabling demand response may comprise: a memory stored with a power rate system, an automatic meter reading data, a monitored data and a power control program of a subscriber; a integrated monitoring module for performing detection of various electric faults, metering of metered (measured) data, detection of facilities status, and control of loads and electric home appliances; a high-level communication module for transmitting the metered and monitored data obtained from an automatic meter reader (AMR) and the integrated monitoring module to a master server, or receiving a control command of the integrated monitoring module transmitted from the master server; and a first microprocessor for transmitting a power control command to a relevant integrated monitoring module in response to the power control program based on the rate system, and controllably transmitting the metered and monitored data stored in the storage to the master server via a high-level communication module.

In some exemplary implementations, the electric smart meter may further comprise: a power detector for detecting a current and a voltage of an electric line; and a second microprocessor for receiving an analogue current and a voltage signal from the power detector and converting the analogue current and the voltage signal to a digital signal and a numerical data for metering of the measured values and transmitting the converted signal and data to the first microprocessor.

In some exemplary implementation, the integrated monitoring module may include a demand controller for reporting various loads, power detection and load control of home electric appliance, load set-up and demand power of each load to the electric smart meter.

In some exemplary implementation, the integrated monitoring module may comprise: an automatic meter reader (AMR) for receiving the metered data from various facilities meters; a facilities controller for receiving status signals of various facilities of a building structure; and an electric safety monitor receiving a signal of electric fault and a temperature measurement value.

In some exemplary implementation, the master server may estimate and control the rate system opted by a subscriber and power demands via power usage collected by the electric smart meter.

In some exemplary implementation, the master server may estimate and control the rate system opted by a subscriber and power demands via power usage collected by the electric smart meter, wherein the electric smart meter may further comprise power stabilization means for supplying a stabilized direct current (DC) power source to each system and the integrated monitoring modules.

In another general aspect of the present disclosure, an electric smart meter enabling demand response may comprise: a memory stored with a power rate system, a metered data, a monitored data and a power control program of a subscriber; an extension interface connected by at least one or more integrated monitoring modules, receiving metered data and monitored data from the integrated monitoring module or transmitting an operation control command to the integrated monitoring module; a high-level communication module transmitting the metered data and monitored data obtained from the integrated monitoring module to a master server side, or receiving a control command of the integrated monitoring module transmitted from the master server; an optical communication module receiving a particular power rate system opted by a wireless terminal using short-distance wireless communication with an external wireless terminal, or transmitting various data stored in the memory to the wireless terminal; and a first microprocessor transmitting a power control command to a relevant integrated monitoring module connected to the extension interface in response to a power control program based on the power rate system and controllably transmitting the metered data and monitored data stored in the memory to the master server side via the high-level communication module.

In another general aspect of the present disclosure, a method for demand response may comprise: establishing, by an electric smart meter, a power rate system opted by a subscriber at a memory; controlling an operation of a relevant load via a demand controller in response to a power control program of the power rate system opted by the subscriber; determining whether a time for stopping the operation of the load has arrived in response to the power rate system; and transmitting, by the electric smart meter, a power stoppage command of the relevant load to the demand controller.

In some exemplary implementation, the electric smart meter may receive the power rate system opted by the subscriber from the master server via the high-level communication module, or receive the power rate system from an external wireless terminal via an optical communication module, wherein the electric smart meter collects a power monitoring data relative to various loads and home electric appliances and data relative to demand power of each load, and periodically transmits the data to the master server.

BRIEF DESCRIPTION OF DRAWINGS

Hereinafter, implementations that are not to be taken in a limiting sense are described in detail with reference to the accompanying drawings. The same reference numerals or symbols are used to identify the same or corresponding elements throughout the drawings.

DETAILED DESCRIPTION

The following exemplary implementations are merely exemplary and are made for the purpose of illustrating the general principles of the present disclosure. The implementations are not meant to limit the inventive concepts claimed herein. For the purpose of clarity, technical material that is known in the technical fields related to the disclosure has not been described in detail so that the disclosure is not unnecessarily obscured.

Figure 1:
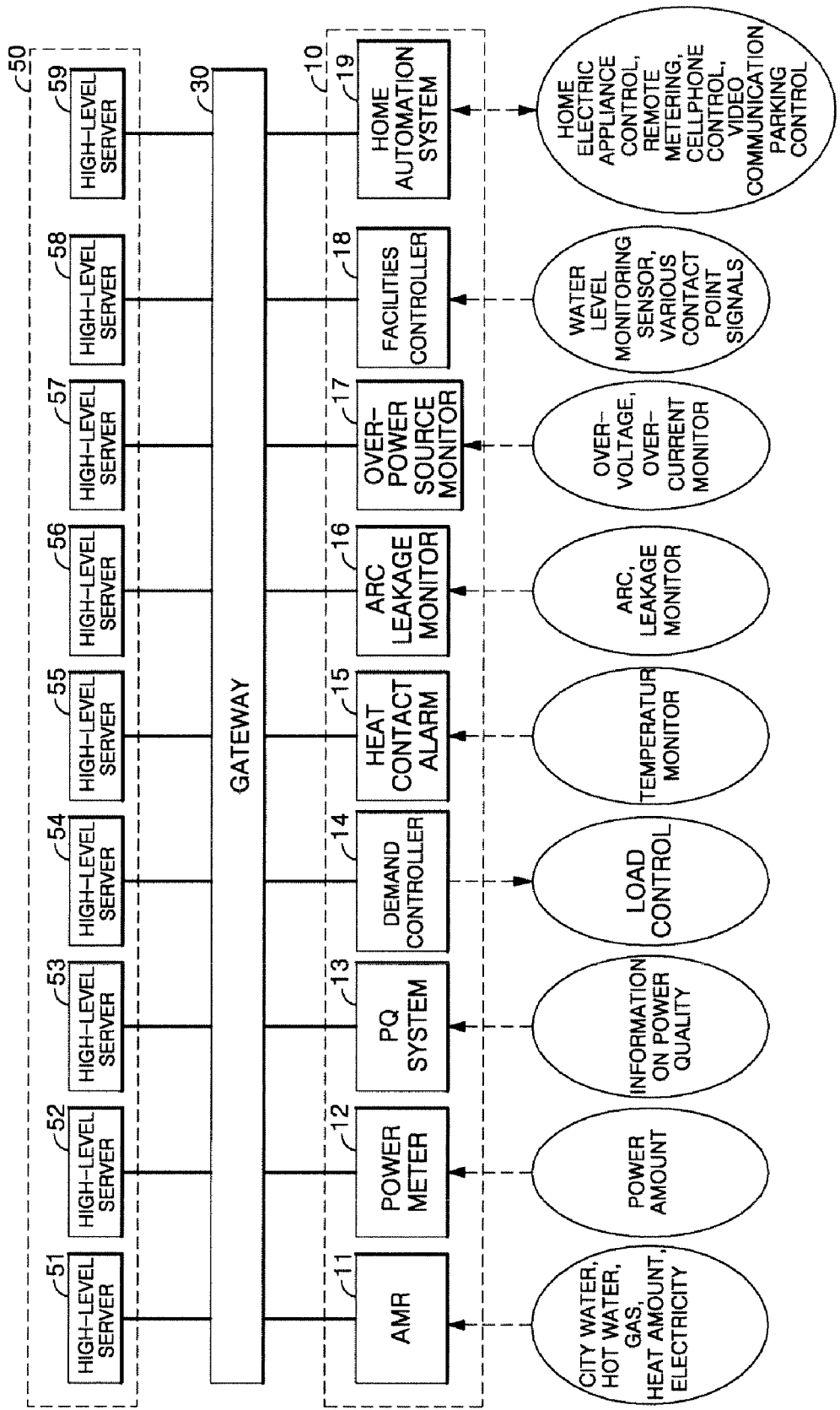
FIG. 1 is a schematic view illustrating various remote metering and controlling systems according to the related art.
Figure 2:
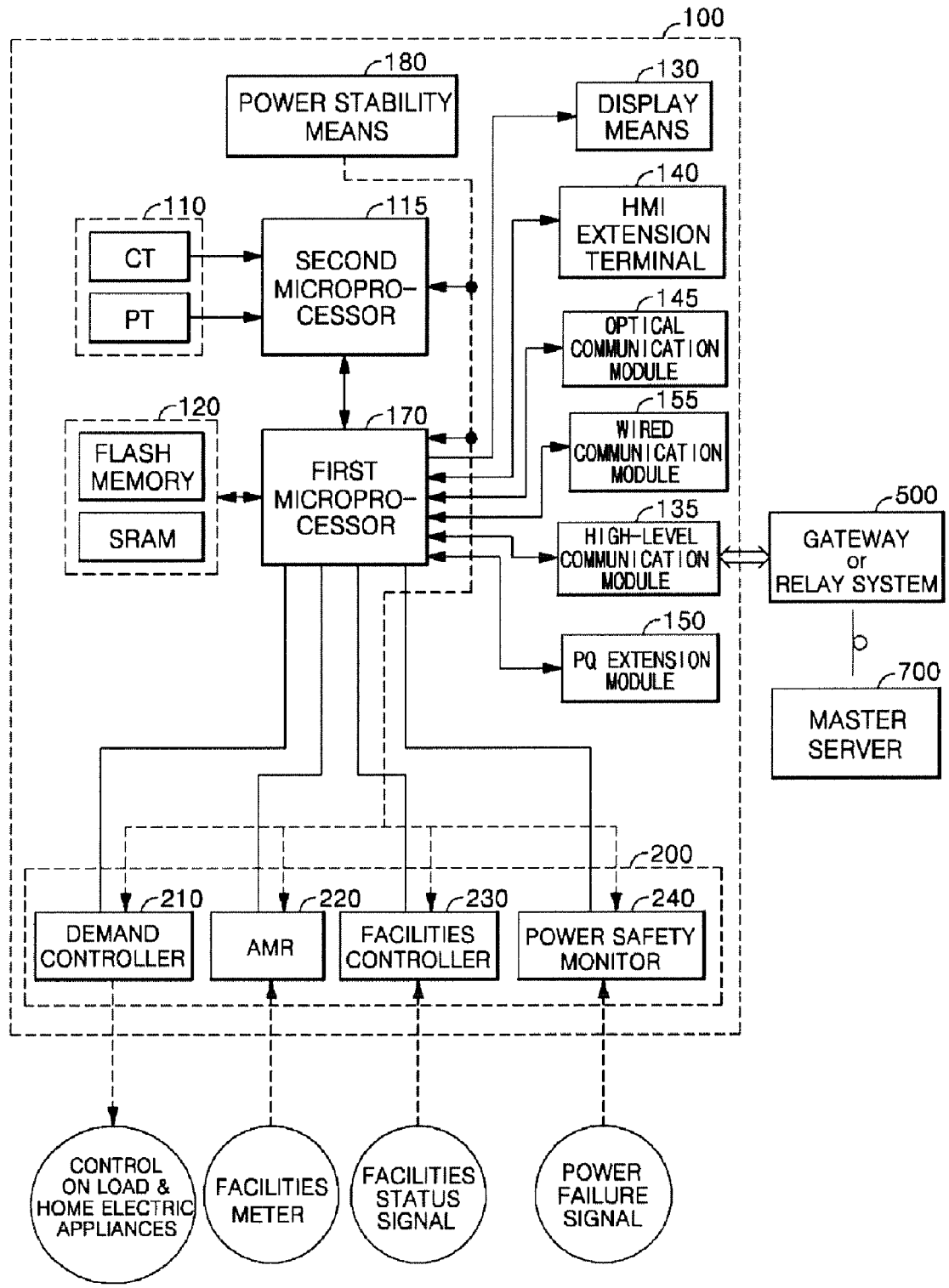
FIG. 2 is a schematic view illustrating various remote metering and controlling systems using an electric smart meter according to an exemplary implementation of the present disclosure.

FIG. 2 is a schematic view illustrating various remote metering and controlling systems using an electric smart meter according to an exemplary implementation of the present disclosure, wherein the system may include an electric smart meter 100, a integrated monitoring module 160, a gateway 500, and a master server 700.

The electric smart meter 100 may include a power detector 110, a second microprocessor 115, a memory 120, a display means 130, a high-level communication module 135, a human-machine interface (HMI) extension terminal 140, an optical communication module 145, a power quality (PQ) extension module 150, a wired communication module 155, a integrated monitoring module 160, a first microprocessor 170 and a power stabilization means 180.

At this time, data between the power detector 110 and the second microprocessor 115 are a metered data, data between the memory 120 and the first microprocessor 170 are a load profile data and various result data, data among the first microprocessor 170, the high-level communication module 135, the HMI extension terminal 140, the optical communication module 145 and wired communication module 155 are data transmitted to the master server and request data, data between the first microprocessor 170 and the PQ extension module 150 are power quality-related data, and data between the first microprocessor 170 and the integrated monitoring module 160 are metered data, monitored data and operation control data.

The power detector 110 may include a current sensor (CT) and a voltage sensor (PT) detecting a current and a voltage of an electric line.

The first microprocessor 115 may be configured to convert an analogue current and a voltage signal received from the power detector 110 to a digital signal and numerical data for metering of the measured values and to transmit the data to the first microprocessor 170.

The memory 120 may include a flash memory and a synchronous random access memory (SRAM) stored with various data collected from an integrated operation program and various external integrated monitoring modules 160.

The display means 130 may be a display (e.g., a light emitting device (LCD) capable of graphically displaying relevant contents (e.g., waveforms and data) based on indicated specifications, and directly displaying the data stored in the storage and an instantaneous data metered by the power detector 110.

The high-level communication module 135 may be a device for communication with the master server 700 and is capable of real-time two-way communication.

The HMI extension terminal 140 may be an extension terminal capable of mounting an additional HMI system to a user who needs a wall pad via a home network connection or to a user who wants an additional display function or a high-end display function for administration purpose.

The optical communication module 145 may be a device for upkeep or repair such as verification of data stored in the memory 120 or upgrade of operation software. That is, the optical communication module 145 is a short distance wireless communication interface such as infrared data access (IrDA) capable of receiving a particular rate system opted by a meter terminal (not shown) via a short distance wireless communication with the meter terminal of a meter reader op upgrading the particular rate system or operation program.

The PQ extension module 150 may be an interface capable of additionally mounting in a module style a high-end, highly accurate PQ meter (above 1024 sampling/cycle) which is a fourth generation PQ meter. The PQ extension module 150 may be installed to cope with a specific demand more than a general PQ function (below 256 sampling/cycle) of the electric smart meter 100.

The wired communication module 155 may be capable of processing a large capacity data at a high speed using an Ethernet module for supporting a variety of communication environments and communicating by being connected to an existing local area network (LAN) or an internet infrastructure without the support of a particular gateway 500 when inter-working with the master server 700.

Preferably, the various communication modules 135, 145 and 155 are configured to attach or detach various kinds of communication conversion cards (e.g., RS-485, R-232, PLC, RF, Zigbee, Ethernet, Bluetooth and CDMA) in an optional way such that various protocol media required by a user can be applied.

The integrated monitoring module 160 may be composed of a plurality of devices capable of performing detection of various electric faults, automatic meter reading, detection of facilities status, and control of loads and home electric appliances.

The integrated monitoring module 160 embedded within the electric smart meter 100 may include a demand response device 161, an automatic meter reader (AMR) 163, a facilities control device 165 and an electric safety monitor 167. The AMR 163 may receive various metered data (e.g., gas, city water, hot water, heat and electricity) from an external facilities meter and transmit the data to the first microprocessor 170. The AMR 163 may support various communication methods (e.g., RS-485, RS-422 and MM-bus) to allow communicating with all kinds of facilities meters.

A demand control unit 161 may control a warning, an alarm, various loads and home electric appliances according to a set-up value or an estimation value. At this time, the demand control unit 161 may control various loads and home electric appliances in response to control of the first microprocessor 170 of the electric smart meter 100. The demand control unit 161 may control various loads using an existing relay control method and a power line communication (PLC) control method as well.

The facilities control device 165 may be capable of managing various facilities such as a building, an apartment building, a building structure, such that the device 165 can perform status monitoring of elevator operation status, hydrant status, water tank status, inundation of basement and an suction/exhaust fan. To this end, the facilities control device 165 may include 4 to 16 digital input terminals (dry contact), 4 to 16 analogue input terminals and a RS-485 communication module for transmitting the monitored data to the electric smart meter 100.

The electric safety monitor 167 may monitor occurrences of arc, electricity leakage, over-voltage and over-current, temperatures, on-off and trip status of a circuit breaker and a switch and transmit relevant data to the first microprocessor 170, and output an alarm or a trip signal (field interruption and remote interruption) according to set-up contents.

The first microprocessor 170 may compute the data transmitted from the second microprocessor 115 using various equations, store resultant data in the memory 120, or store various data transmitted from the integrated monitoring module 160 in the memory 120. Furthermore, the first microprocessor 170 may transmit the data stored in the memory 120 periodically or in response to the request of the master server 700, or control the operation of the integrated monitoring module 160.

The power stabilization means 180 is a device (e.g., switched-mode power supply, SMPS) for supplying a stabilized electricity to the integrated monitoring module 160 and other circuits mounted in a main body of the electric smart meter 100, and is configured to supply a stable voltage of DC 12 volts or DC 5 volts relative to an input voltage within AC 130 volts to 264 volts for a single phase, and within AC 88 volts to 450 volts for a three-phase, such that there is no problem relative to introduction of over-voltage exceeding a rated voltage caused by erroneous wiring by a user.

The gateway 500 is a wired/wireless network for enabling the electric smart meter 100 to communicate with the master server 700.

The master server 700 is an operation system for collecting information of various integrated monitoring modules 160 obtained via the electric smart meter 100 and monitoring/controlling the information. The master server 700 may further include a human-machine interface (HMI) for displaying the information collected from the electric smart meter 100 and managing and operating a relevant electric smart meter 100.

The remote metering system thus mentioned needs enablement of an active participation of a subscriber for effective demand response of energy, and also must be guaranteed of real-time, bi-directivity of communication in order to rapidly and accurately transmit the demand response. Furthermore, an accurate analysis is desired via combined monitoring of many-angled information in consideration of various environments faced by a subscriber in order to enhance the accuracy of demand estimation necessarily required for effectiveness of demand response. To this end, acquisition of information on various elements is required.

In view of the aforementioned view point, the present disclosure may require an automatic meter reading function for obtainment of power and energy information, power quality monitoring function, metering function, demand response function for applying various rate systems and an environment for demand response and a demand control function for energy management. At the same time, as a complementary function to incentive for an active demand response from a subscriber, various functions may be required that include arc and leakage monitoring function for safety of electrical facilities, a heat contact alarm or temperature monitoring function, an over-current and over-voltage monitoring function, a circuit breaker and switch status monitoring function, a facilities management function for monitoring buildings and other structures, facilities monitoring function and home electric appliance monitoring function for advantage of convenience in a house.

Therefore, the electric smart meter 100 according to the present disclosure is so configured as to enable an installation of integrated monitoring modules having all the core functions mentioned above, and it is also possible to select an appropriate application of integrated monitoring modules according to objects and location that are required by the present disclosure.

That is, the electric smart meter 100 according to the present disclosure is embedded with various integrated monitoring modules 161 to 167 and transmits information collected from the integrated monitoring modules to the master server 700 via the communication module 135, and receives a control signal of various integrated monitoring modules from the master server 700 to control a relevant integrated monitoring module 160. As a result, it is possible to remove various communication means separately installed for each existing integrated monitoring module, microprocessors and memories, or to reduce the sizes thereof or to enable simplification of sizes thereof.

The electric smart meter 100 according to the present disclosure thus constructed has been developed in view of the following objects.

First of all, the electric smart meter 100 according to the present disclosure provides to energy service providers and subscribers (large subscribers and general subscribers) the electricity and energy-related information, electricity safety-related information, control function information, building and facilities-related information, information on home network function and information on benefit of convenience in life in association with home automation systems.

The electric smart meter according to the present disclosure presents to the energy service providers and subscribers a variety of operating functions regarding demand response, e.g., energy saving, PQ pricing, $CO_2$ and $NOx$ pricing, and the like.

The electric smart meter according to the present disclosure presents to the energy service providers and subscribers a variety of billing operating functions, e.g., uniform price, time of use price, real-time price, critical-peak price and the like.

The electric smart meter according to the present disclosure provides to the energy service providers and subscribers (large and general subscribers) transactions among market participants, and participation algorithm of electricity and energy transaction markets (future trading and spot trading).

The electric smart meter according to the present disclosure presents to the energy service providers and facilities providers a fourth generation PQ function capable of performing a year-round and real-time monitoring on power quality, finding failure occurrences, and analyzing temporary phenomenon.

The electric smart meter according to the present disclosure presents real-time, bi-directive and integrated information control environment to the energy service providers and facilities providers. That is, a bi-directional communication between the electric smart meter 100 and the master server 700 is made possible, and a real-time transmission of data stored in the memory 120 of the electric smart meter 100 to the master server 700 enables the energy service providers and facilities providers to monitor the power quality, failure occurrences and the temporary phenomenon. Furthermore, the electric smart meter 100 may be utilized as a core module for an intelligent digital distributing board and a core module for intelligent digital switchgear as well.

The electric smart meter 100 so configured as to accomplish the aforementioned objects performs a variety of functions for each module, where the functions may include computing and billing, remote metering, power quality monitoring, maximum demand control and management, electric safety monitoring and controlling, facilities management, data display, home automation, manual metering, operating software keep and repair, demand response or control, and information connection of substation systems, communication and PQ monitoring.

The measuring function is operated in such a manner that the first microprocessor 170 receives from the second microprocessor 115 a signal detected from the power detector 110, and the provided data is adequately computed according to the need to obtain the measured data. The measured data may include voltage, current (RMS or Maximum), frequency, active power (forward direction, forward direction maximum, accumulated forward), inactive power, apparent power, maximum demand power (accumulated from previous month, currently accumulated), accumulated amount of active power (previous month, current), accumulated amount of inactive power (previous month, current), accumulated amount of apparent power, power factor (previous month, current), and compensation for power stoppage.

The remote reading function is operated in such a manner that the first microprocessor 170 of the electric smart meter 100 collects a variety of measured data from the AMR 163. The first microprocessor 170 receives from the AMR 163 a pulse relative to various measured values (electricity, gas, city water, temperature, hot water and the like) and stores the values at the memory 120, where the master server 700 performs a real-time monitoring on power transmission, power stoppage compensation, and other necessary data, an analysis on metered data, a monthly report, a daily report, a transient report and internet metering, provision of information on metering for each household or time and rate inquiry.

The PQ monitoring function is operated in such a way that the first microprocessor 170 receives from the second microprocessor 151 a signal detected by the power detector 110, and computes the signal accordingly as required to determine the power quality. The power quality may include sag, swell, voltage and current imbalance, flickering, voltage (active amount of power, between lines, phases and the like), current (average, line, load rate and reverse phase and the like), phase, power, use of electricity (active amount of power, reactive amount of power), frequency, power factor, distortion rate, harmonics, demand and maximum values (current, distortion rate, active power, demand and the like).

The functions regarding the maximum demand control and demand response control are such that the first microprocessor 170 of the electric smart meter 100 checks various load status and electricity status of the home electric appliances to control each load and operation of the home electric appliances. That is, the functions regarding the maximum demand control and demand response control may include monitoring of various loads and electricity of home electric appliances (current power, standard power target power, peak power, estimated power display and control according to the output method, and graphical display), pattern and trend analysis, load control in response to set-up value (load characteristic, control according output method, and control for each season and business), rate system adjustment (for each season and business), load set-up (number of loads, control commencement time, load input time, load interruption time and the like), alarming function, (capable of setting up the function for each step), power demand reporting function, remote load control and load connection function.

The power safety monitoring and control functions are such that the first microprocessor 170 of the electric smart meter 100 receives various power failures and temperature measurement values from the power safety monitoring device 167 and stores the values in the memory 120, and periodically transmits the same to the master server 700. The power safety monitoring and control functions may include temperature monitoring, arc and leakage monitoring.

The facilities monitoring function is operated in such a fashion that the first microprocessor 170 of the electric smart meter 100 receives a facilities status signal from the facilities controller 165, stores the signal in the memory 120 and periodically transmits the stored signal to the master server 700. The facilities controlling function may include facilities monitoring within a building and a building structure (water level monitor, water tank water level monitor, inundation, elevator, hydrant pump, fire alarm receiving board, suction/exhaust fan, power facilities and the like) and control recording monitor.

The data display function is such that the first microprocessor 170 of the electric smart meter 100 displays on the display means 130 information on automatic meter readings, measurement data, PQ data, demand control, power safety monitor, facilities management, various data display relative to demand control function, forward direction and backward direction measurement display, data trend display (graphically), alarm, set-up value, various events, communication-related information and the like.

Furthermore, the manual metering and operating software keep and repair functions are such that the master server 700 is connected to various integrated monitoring modules 160 via the communication module 135 of the electric smart meter 100 to perform the metering in relation to failure or other necessities, and the maintenance and repair of components, and is also connected to a relevant integrated monitoring module 160 to perform upgrading jobs of firmware of relevant components.

As described above, the electric smart meter 100 is installed therein with various integrated functions and integrated circuits, and is capable of component extension of various functions. For example, the first and second microprocessor 170, 115 of FIG. 2 may be formed using a single integrated circuit, and the memory 120 may be also formed using a single memory device instead of a plurality of memory devices. The integrated monitoring modules 160 performing various functions may be additionally added later by protection-functioning components as required. The scope of use of the present disclosure is indeed very broad, and the electric smart meter according to the present disclosure may be installed on a distributing board and be configured as a domestic and industrial intelligent digital distributing board in association with the distributing board, which may be extended for use as a portal device or a consumer portal device.

Figure 3:
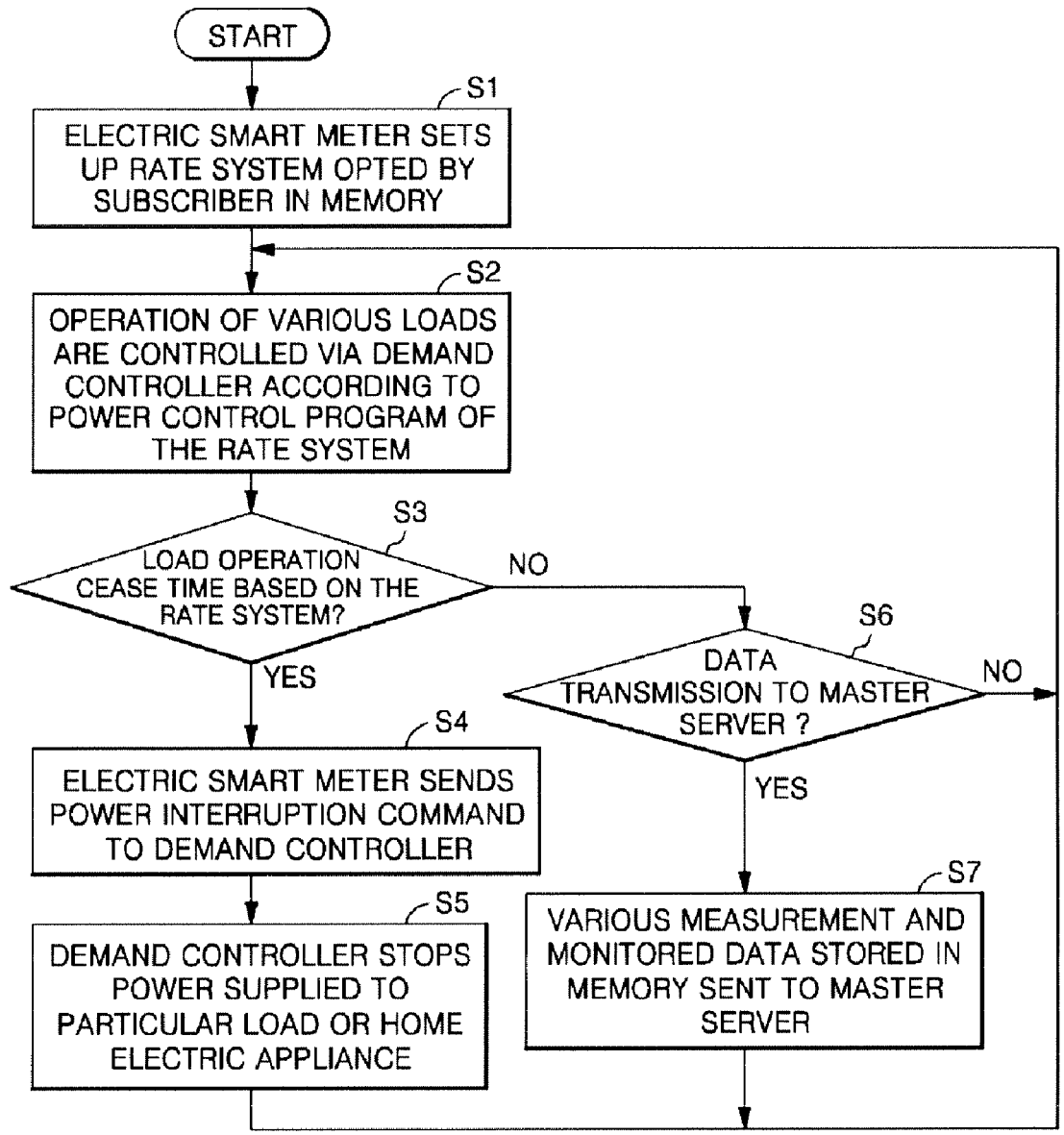
FIG. 3 is a schematic flowchart illustrating a method for demand response using an electric smart meter according to an exemplary implementation of the present disclosure.

FIG. 3 is a schematic flowchart illustrating a method for demand response using an electric smart meter according to an exemplary implementation of the present disclosure, the drawing of which will be used in association with FIG. 2.

First of all, the electric smart meter 100 receives a rate system opted by a subscriber from the master server 700 or the optical communication module 145 and sets up the system in the memory 120 (S1). The memory 120 is pre-stored with a power control program related with the rate system.

The various methods of inputting the rate system to the electric smart meter 100 may be available but may include two types, one being a method of the master server 700 transmitting the rate system information opted by the subscriber via the high-level communication module 135 of the electric smart meter 100, and the other being a method of a meter reader (service man) inputting the rate system via the optical communication module 145 of the electric smart meter 100 through a meter terminal (not shown).

Successively, the first microprocessor 170 of the electric smart meter 100 transmits a power control command to the demand controller 161 in response to a relevant power control program related to the rate system, whereby the demand controller 161 controls a particular load or operation of home electric appliance (S2). The control in association with the rate system may be a control in association with time based on whether power has been supplied, and a control based on the kind of load such as an air conditioner, a heater, a flash light and a home electric appliance.

Then, the first microprocessor 170 of the electric smart meter 100 determines whether a current time is a time for stopping the operation of a load according to the rate system (S3).

If the time is the one for stopping the operation of the load, the first microprocessor 170 sends a power cease (interruption) command (which is a load stoppage command) to the demand controller 161 (S4). Accordingly, the demand controller 161 stops the electricity supplied to a particularly set-up load or a home electric appliance in response to the rate system to forcibly interrupt the operation of the load (S5). The first microprocessor 170 may also send information on a particular load to which the power is to be interrupted when the load cease command is transmitted to the demand controller 161. It should be apparent that the power is not stopped if it is not the time for stopping the operation of the load.

Meanwhile, the electric smart meter 100 sends the data stored in the memory 120, periodically or in response to the master server 700, to the master server 700 via the gateway or relay system 500 (S6, S7). The transmitted data may be comprised of measured data inclusive of electricity usage and various energy usage and monitored data including electricity, facilities status and temperature.

Therefore, the master server 700 may estimate and control an amount of the power demand via the rate system opted by the subscriber and electricity usage collected by the electric smart meter 100.

Figure 4:
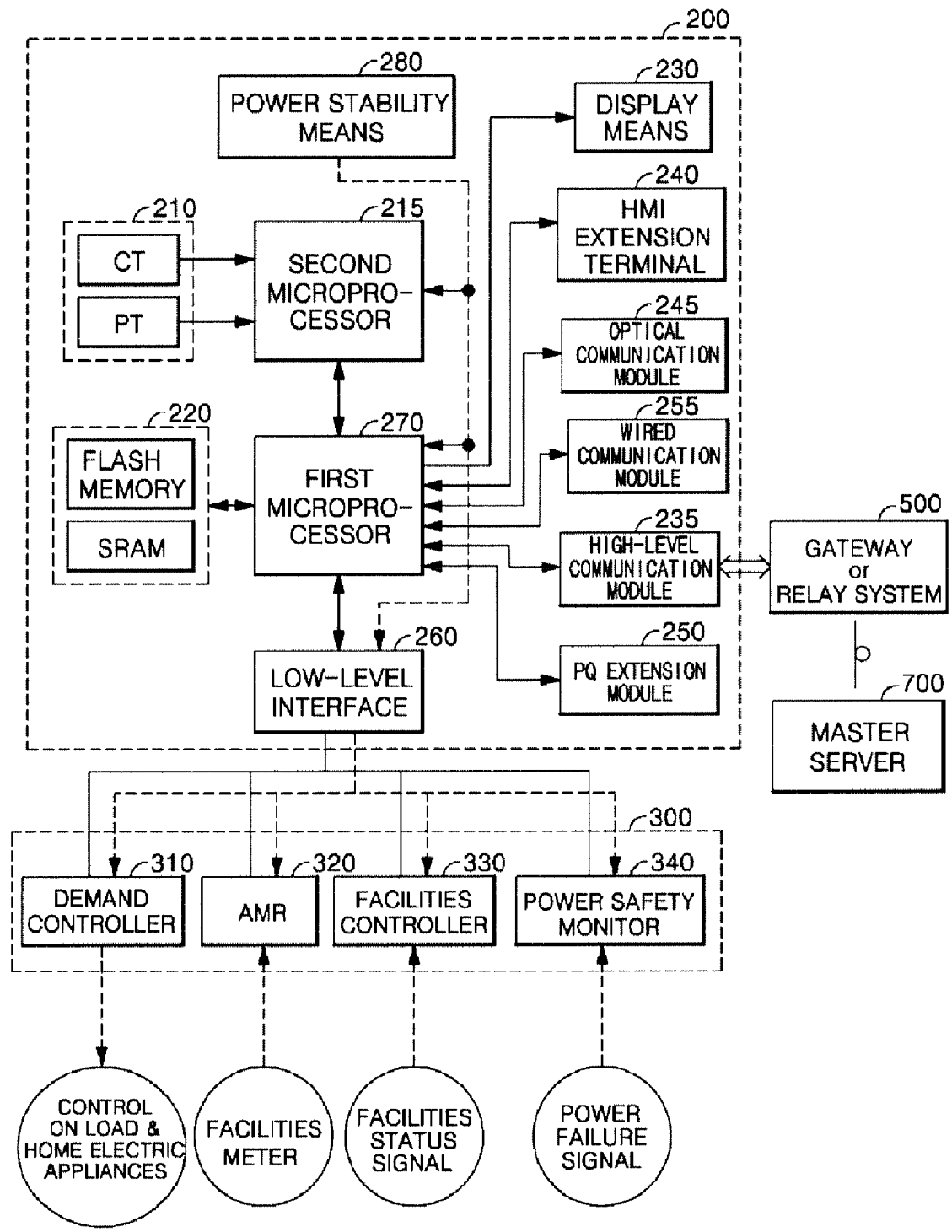
FIG. 4 is a schematic view illustrating various remote metering and controlling systems using an electric smart meter according to another exemplary implementation of the present disclosure.

FIG. 4 is a schematic view illustrating various remote metering and controlling systems using an electric smart meter according to another exemplary implementation of the present disclosure, where the system includes an electric smart meter 200, a integrated monitoring module 300, gateway 500 and a master server 700.

In FIG. 4, the integrated monitoring module 300 is installed outside of the electric smart meter 200, unlike the configuration of FIG. 2, where the electric smart meter 200 can communicate with the integrated monitoring module 300 via a predetermined extension interface.

The electric smart meter 200 may include a power detector 210, a second microprocessor 215, a memory 220, a high-level communication module 235, a human-machine interface (HMI) extension terminal 240, an optical communication module 245, a power quality (PQ) extension module 250, a wired communication module 255, a low-level interface 260, a first microprocessor 270 and a power stabilization means 280.

The configurations other than the low-level interface 260 and the first microprocessor 270 in the electric smart meter 200 of FIG. 4 have the same functions as those of FIG. 2, such that a detailed explanation thereto will be omitted.

The low-level interface 260 may be a communication interface such as RS-485 and RS-422 for being connected to an external integrated monitoring module 300 such as a demand controller 310, an automatic meter reader (AMR, 320), a facilities controller 330 and a power safety monitor 340.

The first microprocessor 270 may compute the data transmitted from the second microprocessor 215 using various equations, and store a resultant value in the memory 220, or store various data sent by the integrated monitoring modules 300 in the memory 220. Furthermore, the first microprocessor 270 is so configured as to transmit the data stored in the memory 220 periodically or in response to request of the master server 700, or to control the operation of the integrated monitoring modules 300.

Meanwhile, the integrated monitoring modules connected to the electric smart meter 200 may include a demand controller 310, an automatic meter reader (AMR, 320), a facilities monitor 330 and an power safety monitor 340, where the AMR 320 receives various measurement data (e.g., gas, city water, hot water, heat, electricity) from an external facilities meter and sends the data to the first microprocessor 270 via the low-level interface 260 of the electric smart meter 200. The AMR 320 is connected to the electric smart meter 200 via RS-485 interface, and supports a variety of communication methods (e.g., RS-485, RS-422 and MM-bus) so that communication is enabled with all types of facilities meters.

The demand controller 310 may control a warning, an alarm, various loads and home electric appliances in response to a set-up value or an estimation value, and may also control various loads and home electric appliances according to the control of the first microprocessor 270 of the electric smart meter 200. The demand controller 310 may control the various loads using the existing relay method and the power line communication (PLC) method as well.

The facilities monitor 330 is capable of managing various facilities including buildings, apartment buildings, and other structures. The facilities monitor 330 is also capable of monitoring an elevator operation status, a hydrant status, a water tank status, an inundation status of basement, and a suction/exhaust fan status. To this end, the facilities monitor 330 is equipped with 4 to 16 digital input terminals (dry contact) and 4 to 16 analogue input terminals, and is also installed with an RS-485 communication module for transmitting the monitored data to the electric smart meter 200.

The power safety monitor 340 may monitor arc, leakage, over-voltage, over-current, temperatures, circuit breakers and switches (on, off and trip), transmit a relevant data to the electric smart meter 200, and output an alarm or a circuit interruption command (trip signal: field interruption or remotely controlled interruption) to the electric smart meter 200 in response to a set-up content.

The gateway 500 is a wired/wireless network for allowing the electric smart meter 200 to communication with the master server 700.

Furthermore, the master server 700 is an operation system for collecting, monitoring and managing information on various integrated monitoring modules 300 obtained from the electric smart meter 200. The master server 700 may further include a human-machine interface (HMI) for displaying the information collected by electric smart meter 200, managing and operating a relevant electric smart meter 200.

The remote metering system thus mentioned therefore needs enablement of an active participation of a subscriber for effective demand response of energy, and also must be guaranteed of real-time, bi-directivity of communication in order to rapidly and accurately transmit the demand response. Furthermore, an accurate analysis is desired via combined monitoring of many-angled information in consideration of various environments faced by a subscriber in order to enhance the accuracy of demand estimation necessarily required for effectiveness of demand response. To this end, acquisition of information on various elements is required.

In view of the aforementioned view point, the present disclosure may require an automatic meter reading function for obtainment of power and energy information, power quality monitoring function, metering function, demand response function for applying various rate systems and an environment for demand response and a demand control function for energy management. At the same time, as a complementary function to incentive for an active demand response from a subscriber, various functions may be required that include arc and leakage monitoring function for safety of electrical facilities, a heat contact alarm or temperature monitoring function, an over-current and over-voltage monitoring function, a circuit breaker and switch status monitoring function, a facilities management function for monitoring buildings and other structures, facilities monitoring function and home electric appliance monitoring function for advantage of convenience in a house.

Therefore, the electric smart meter 200 according to the present disclosure is so configured as to enable an installation of integrated monitoring modules having all the core functions mentioned above, and it is also possible to select an appropriate application of integrated monitoring modules according to objects and location that are required by the present disclosure.

That is, the electric smart meter 200 according to the present disclosure is made to enable a connection with various integrated monitoring modules via the low-level interface, where the integrated monitoring modules can communicate with the master server via the communication module of the electric smart meter. As a result, it is possible to remove relevant communication means of the integrated monitoring module, and to simplify the function of microprocessors and memory and the sizes thereof.

The electric smart meter 200 thus configured performs a variety of functions for each module, where the functions may include computing and billing, remote metering, power quality monitoring, maximum demand control and management, electric safety monitoring and controlling, facilities management, data display, home automation, manual metering, operating software keep and repair, demand response or control, and information connection of substation systems, communication and PQ monitoring.

The remote reading function is operated in such a manner that the second microprocessor 270 of the electric smart meter 200 collects a variety of measured data from the AMR 320. The second microprocessor 270 receives from the AMR 320 a pulse relative to various measured values (electricity, gas, city water, temperature, hot water and the like) and stores the values at the memory 220, where the master server 700 performs a real-time monitoring on power transmission, power stoppage compensation, and other necessary data, an analysis on metered data, a monthly report, a daily report, a transient report and internet metering, provision of information on metering for each household or time and rate inquiry.

The functions regarding the maximum demand control and demand response control are such that the second microprocessor 270 of the electric smart meter 200 checks various load status and electricity status of the home electric appliances to control each load and operation of the home electric appliances. That is, the functions regarding the maximum demand control and demand response control may include monitoring of various loads and electricity of home electric appliances (current power, standard power target power, peak power, estimated power display and control according to the output method, and graphical display), pattern and trend analysis, load control in response to set-up value (load characteristic, control according output method, and control for each season and business), rate system adjustment (for each season and business), load set-up (number of loads, control commencement time, load input time, load interruption time and the like), alarming function, (capable of setting up the function for each step), power demand reporting function, remote load control and load connection function.

The power safety monitoring and control functions are such that the second microprocessor 270 of the electric smart meter 200 receives various power failures and temperature measurement values from the power safety monitoring device 340 and stores the values in the memory 220, and periodically transmits the same to the master server 700. The power safety monitoring and control functions may include temperature monitoring, arc and leakage monitoring.

The facilities monitoring function is operated in such a fashion that the second microprocessor 270 of the electric smart meter 200 receives a facilities status signal from the facilities controller 330, stores the signal in the memory 220 and periodically transmits the stored signal to the master server 700. The facilities controlling function may include facilities monitoring within a building and a building structure (water level monitor, water tank water level monitor, inundation, elevator, hydrant pump, fire alarm receiving board, suction/exhaust fan, power facilities and the like) and control recording monitor.

Furthermore, the manual metering and operating software keep and repair functions are such that the master server 700 is connected to various integrated monitoring modules 300 via the communication module 235 of the electric smart meter 200 to perform the metering in relation to failure or other necessities, and the maintenance and repair of components, and is also connected to a relevant integrated monitoring module 300 to perform upgrading works of firmware of relevant components.

As described above, the electric smart meter 200 is installed therein with various integrated functions and integrated circuits, and is capable of component extension of various functions. For example, the first and second microprocessor 270, 215 of FIG. 4 may be formed using a single integrated circuit, and the memory 220 may be also formed using a single memory device instead of a plurality of memory devices. The integrated monitoring modules 300 performing various functions may be additionally added later by protection-functioning components as required. The scope of use of the present disclosure is indeed very broad, and the electric smart meter according to the present disclosure may be installed on a distributing board and be configured as a domestic and industrial intelligent digital distributing board in association with the distributing board, which may be extended for use as a portal device or a consumer portal device.

As described above, electric power supplied to various loads and home electric appliances may be automatically interrupted according to the rate system to prevent unnecessary power consumption and to enable a systematically planned power consumption on the part of subscribers, and to enable a planned estimation of power demand, and active preparation or countermeasure in terms of power generation reserve rate according to the rate system on the part of the electricity suppliers.

Still other exemplary implementations will become readily apparent to those skilled in this art from reading the above-recited detailed description and drawings of certain exemplary implementations. It should be understood that numerous variations, modifications, and additional implementations are possible, and accordingly, all such variations, modifications, and implementations are to be regarded as being within the spirit and scope of the appended claims.

What is claimed is:

1. An electric smart meter enabling demand response, the meter comprising:
   a memory for storing a power rate system, metered data, monitored data and a power control program of a subscriber;
   one or more integrated monitoring modules for performing detection of various electric failures, automatic reading of the metered data, detection of facilities status, and control of loads and electric home appliances;
   a high-level communication module for either transmitting the metered data and the monitored data obtained from an automatic meter reader (AMR) and the one or more integrated monitoring modules to a master server or receiving a control command from the one or more integrated monitoring modules as transmitted by the master server; and
   a first microprocessor for transmitting a power control command to the one or more integrated monitoring modules in response to the power control program, the power control program being based on the power rate system, and transmitting the metered data and the monitored data stored in the memory via the high-level communication module,
   wherein the high-level communication module performs two-way communication with the master server for remote metering, remote control and demand response with the one or more integrated monitoring modules.

2. The meter of claim 1, further comprising:
   a power detector for detecting a current and a voltage of an electric line; and
   a second microprocessor for:
      receiving an analog current signal and a voltage signal from the power detector;
      converting the analog current signal and the voltage signal to a digital signal and numerical data for metering of measured signals; and
      transmitting the digital signal and numerical data to the first microprocessor.

3. The meter of claim 1, wherein the one or more integrated monitoring modules comprise:
   a demand controller for reporting loads, power detection, and control of the loads and home electrical appliances, load set-up, and power demand of each load to the high-level communication module.

4. The meter of claim 3, wherein the one or more integrated monitoring modules further comprise:
   the AMR for receiving the metered data from facility meters;
   a facilities controller for receiving status signals from facilities of a building structure; and
   an electric safety monitor for receiving a signal of an electric fault and a temperature measurement value.

5. The meter of claim 1, wherein the master server estimates and controls the power rate system as selected by the subscriber.

6. The meter of claim 1, further comprising power stabilization means for supplying a stabilized direct current (DC)

power source to each power rate system and the one or more integrated monitoring modules.

7. An electric smart meter enabling demand response, the meter comprising:
   a memory for storing a power rate system, metered data, monitored data and a power control program of a subscriber;
   an extension interface connected by one or more integrated monitoring modules, the extension interface receiving the metered data and the monitored data from the one or more integrated monitoring modules or transmitting an operation control command to the one or more integrated monitoring modules;
   a high-level communication module for either transmitting the metered data and the monitored data obtained from the one or more integrated monitoring modules to a master server, or receiving a control command of the one or more integrated monitoring modules transmitted from the master server;
   an optical communication module for either receiving a particular power rate system selected by a wireless terminal using a short-distance wireless communication with an external wireless terminal or transmitting data stored in the memory to the external wireless terminal; and
   a first microprocessor for transmitting a power control command to the one or more integrated monitoring modules in response to the power control program, the power control program being based on the particular power rate system, and transmitting the metered data and the monitored data stored in the memory to the master server side via the high-level communication module,
   wherein the high-level communication module performs two-way communication with the master server for remote metering, remote control and demand response with the one or more integrated monitoring modules.

8. The meter of claim 7, wherein the one or more integrated monitoring modules comprise a demand controller for reporting loads, power detection, load control of home electrical appliances, load set-up, and power demand of each load.

9. The meter of claim 7, wherein the extension interface is an RS-485 interface connected to the one or more integrated monitoring modules, the modules comprising an automatic meter reader for receiving measured data from facilities meters, a facilities monitor for receiving a status signal of various facilities and a power safety monitor for receiving an electric failure signal and measured temperature values.

10. A method for demand response using an electric smart meter, the method comprising:
    establishing a power rate system selected by a subscriber;
    controlling an operation of a relevant load via a demand controller in response to a power control program of an established power rate system;
    determining whether a time for stopping the operation of the load has arrived in response to the established power rate system;
    transmitting a power stoppage command of the relevant load to the demand controller; and
    performing two-way communication with a master server for remote metering, remote control and demand response with one or more integrated monitoring modules.

11. The method of claim 10, wherein the electric smart meter receives either the power rate system selected by the subscriber from the master server via a high-level communication module or receives the power rate system from an external wireless terminal via an optical communication module.

12. The method of claim 10, further comprising:
    collecting power monitoring data relative to home electrical appliances and power demand and
    transmitting the data to the master server.

* * * * *